United States Patent
Hung et al.

(10) Patent No.: US 11,522,332 B2
(45) Date of Patent: Dec. 6, 2022

(54) OPTICAL RECEIVER USING A PHOTONIC INTEGRATED CIRCUIT WITH ARRAY OF SEMICONDUCTOR OPTICAL AMPLIFIERS

(71) Applicant: Nguyen Tan Hung, Da Nang (VN)

(72) Inventors: Nguyen Tan Hung, Da Nang (VN); Truong Cao Dung, Hanoi (VN)

(73) Assignee: Nguyen Tan Hung, Da Nang (VN)

(*) Notice: Subject to any disclaimer, the term of this patent is extended or adjusted under 35 U.S.C. 154(b) by 91 days.

(21) Appl. No.: 17/220,213

(22) Filed: Apr. 1, 2021

(65) Prior Publication Data
US 2022/0320814 A1 Oct. 6, 2022

(51) Int. Cl.
| | | |
|---|---|---|
| H04B 10/00 | (2013.01) | |
| H01S 3/067 | (2006.01) | |
| H04B 10/2513 | (2013.01) | |
| G02B 6/293 | (2006.01) | |
| H04J 14/00 | (2006.01) | |

(52) U.S. Cl.
CPC ...... *H01S 3/06725* (2013.01); *G02B 6/29394* (2013.01); *H01S 3/06754* (2013.01); *H04B 10/2513* (2013.01); *H04B 2210/003* (2013.01)

(58) Field of Classification Search
CPC .............. H04B 10/25; H04B 10/2507; H04B 10/25073; H04B 10/2513; H04B 10/25133
See application file for complete search history.

(56) References Cited

U.S. PATENT DOCUMENTS

| | | | |
|---|---|---|---|
| 7,061,657 B1 | 6/2006 | Fishman et al. | |
| 7,496,298 B2 | 2/2009 | Chen et al. | |
| 7,555,220 B2 | 6/2009 | Grubb et al. | |
| 2009/0245713 A1* | 10/2009 | Doerr ............... | H04B 10/25133 385/2 |
| 2017/0170903 A1* | 6/2017 | Jain .................. | H04B 10/25752 |

FOREIGN PATENT DOCUMENTS

| | | |
|---|---|---|
| EP | 1087553 A1 | 3/2001 |
| EP | 1367744 A2 | 12/2003 |
| EP | 2648352 A1 | 10/2013 |

* cited by examiner

*Primary Examiner* — Daniel G Dobson
(74) *Attorney, Agent, or Firm* — K&L Gates LLP

(57) ABSTRACT

In one embodiment, an intensity modulated (IM) direct detection (DD) optical receiver using a photonic integrated circuit (PIC) with an array of semiconductor optical amplifiers (SOAs) for flexible chromatic dispersion compensation (CDC) is provided. The PIC comprises an 1:N optical splitter to split an input optical signal into N copies; an array of N semiconductor optical amplifiers (SOAs) to receive the N optical outputs from the optical splitter; an array of optical delay lines to receive the outputs from the N SOAs, wherein the delay coefficients for the array of optical delay lines are $\{0, T, 2T, \ldots (N-1)T\}$, where $T=\frac{1}{2}B$, where B is the system symbol rate, and each optical path with odd index (1, 3, 5, ... N−1) from the N optical paths includes a 90-degree phase-shifter; and an optical N:1 coupler to re-combine all N optical paths. A method for automatically controlling a PIC based on the feedback signal from the Rx DSP in an optical receiver is also provided.

12 Claims, 5 Drawing Sheets

OPTICAL RECEIVER USING A PHOTONIC INTEGRATED CIRCUIT WITH ARRAY OF SEMICONDUCTOR OPTICAL AMPLIFIERS

TECHNICAL FIELD

The present disclosure relates to optical communication apparatus, and more specifically, to an intensity modulated (IM) direct detection (DD) optical receiver using a photonic integrated circuit with an array of semiconductor optical amplifiers (SOAs) for flexible chromatic dispersion compensation (CDC).

BACKGROUND ART

This section introduces aspects that may help facilitate a better understanding of the disclosure. Accordingly, the statements of this section are to be read in this light and are not to be understood as admissions about what is in the prior art or what is not in the prior art.

To satisfy the exponential growing of data traffic in data-center, mobile-fronthaul and metropolitan area networks, the International Institute of Electrical and Electronics Engineers (IEEE) is actively working on specifying a new Ethernet standard rate of 100 Gb/s per channel over 10 kin. It is expected that the standard will be finalized in 2021, which will allow for achieving 400 Gb/s of Ethernet rate over 10 kin using 4 optical wavelengths in the O-band. As the data traffic is continuing to grow exponentially with no signs of saturation, we can expect that 200 Gb/s or even 400 Gb/s per channel Ethernet data rate will be required in near future.

Due to the cost, power consumption and physical size constrains, all optical Ethernet transceivers use a simple IM-DD transmission technique, where the data is encoded only on the intensity of an optical carrier. This modulation technique is called one-dimensional modulation format. However, as the symbol rate increases, the impact of chromatic dispersion on the performance of IM-DD transmission becomes severe, which limits the reach. For example, the reach of 1.6 Tb/s PAM4 transmission using 8 wavelengths in O-band such as LAN-WDM8 will be limited by only ~4 kin even when the PAM4 transceivers are ideal. The issue is that the impact of chromatic dispersion (CD) on an IM-DD system cannot be effectively mitigated using digital signal processing technique as the information about the optical carrier phase is lost after direct detection. This situation requires the usage of optical CD compensation or mitigation prior direct detection.

In the prior art, commons optical CD compensation techniques include dispersion compensating fiber (DCF) and fiber-bragg grating (FBG). However, DCF and tunable FGB are too bulky and cannot be put into a hot-pluggable form factors which are required for Ethernet transceivers, such as QSFP and SFP. In addition, DCF provides a fixed compensation of the CD, which is not tunable.

SUMMARY OF INVENTION

In view of the foregoing problem, this invention disclosure provides a new design for a high-speed IM-DD receiver.

According to a first aspect, there is provided a photonic integrated circuit (PIC) for flexible chromatic dispersion compensation (CDC) in an optical receiver of an optical communications system. The PIC according to one embodiment of the invention comprises an 1:N optical splitter to split an input optical signal into N copies, where N is an even number; an array of N semiconductor optical amplifiers (SOAs) to receive and amplify the N optical outputs from the optical splitter; an array of optical delay lines to receive the outputs from the N SOAs, wherein the delay coefficients for the array of optical delay lines are $\{0, T, 2T, \ldots (N-1)T\}$, where $T=\frac{1}{2}B$, where B is the system symbol rate, and each optical path with odd index $(1, 3, 5, \ldots N-1)$ from the N optical paths includes a 90-degree phase-shifter; and an optical N:1 coupler to re-combine all N optical paths.

According to an exemplary embodiment of the first aspect, the SOAs are controlled and adjusted automatically by a low-speed control circuitry using a feedback signal from a digital signal processor for providing chromatic dispersion (CD) compensation.

According to another exemplary embodiment of the first aspect, the SOAs are controlled and adjusted manually by the currents supplied by a current distribution circuit for providing chromatic dispersion (CD) compensation.

According to a second aspect, a method for automatically controlling a photonic integrated circuit (PIC) for flexible chromatic dispersion compensation (CDC) at a receiver is provided. The method comprises the steps of: receiving an input optical signal by a photonic integrated circuit (PIC) having an array of semiconductor optical amplifiers (SOAs); detecting, by a photo-detector (PD), optical signal output from a PIC into electrical signal; amplifying the received electrical signal by a transimpedance amplifier (TIA); digitalizing the amplified signal by using an analog-to-digital converter (ADC); processing the digitalized signal by a digital signal processor (DSP), wherein the DSP performs clock data recovery and timing recovery, feeds the signal after timing recovery into a feed-forward equalizer using a Finite impulse response (FIR) filter, and makes decision by mapping each symbol among the output symbols of the FIR filter which are denoted as Y(n) to an pulse amplitude modulation (PAM) symbol which is closet to Y(n), where $n=1, 2, \ldots$ is the symbol index. The DSP defines the error signal e(n) feedback by the following formula: $e(n)=Y(n)-Z(n)$, where Z(n) is denoted as the symbol after decision; and updates the coefficients of the FIR filter based on the e(n) through the least-mean-square (LMS) algorithm.

With reference to the first possible embodiment of the second aspect of the invention, the DSP feeds the e(n) to a low-speed digital-analog converter (DAC) to analogize the e(n) signal; then feeds the output of the low-speed DAC into an array of N automatic bias control (ABC) corresponding to the N SOAs of the PIC, where each of N ABCs is pre-set with a certain coefficient to adjust its output voltage to minimize the input error signal; and feeds the outputs of the N ABCs into N transconductance amplifiers (TA) corresponding to the N SOAs of the PIC to convert the output voltages of N ABCs to N equivalent currents; and finally supplies the N equivalent currents output from N TAs to N corresponding SOAs to control and adjust the array of SOAs of the PIC.

With reference to the second possible embodiment of the second aspect of the invention, the DSP calculates and updates digitally based on the e(n) to output N voltage values in digital form corresponding to the N SOAs of the PIC; converts the N voltage values into analog form using an array of N low-speed DACs; feeds the outputs of the N low-speed DACs into N transconductance amplifiers (TA) operated in the fixed gain mode corresponding to the N SOAs of the PIC to convert the output voltages of N DACs into N equivalent currents; and supplies the N equivalent currents output from N TAs to N corresponding SOAs to control and adjust the array of SOAs of the PIC.

According to a third aspect, provided is an optical receiver comprising a PIC including N SOAs; a photo-detector (PD) for detecting optical signal output from a PIC into electrical signal; a transimpedance amplifier (TIA) for amplifying the electrical signal output from the PD; an analog-to-digital converter (ADC) for digitalizing the amplified signal output from TIA; and a digital signal processor (DSP) for processing the digitalized signal output from the ADC, wherein the DSP performs clock data recovery and timing recovery, feeds the signal after timing recovery into a feed-forward equalizer using a Finite impulse response (FIR) filter, and makes decision by mapping each symbol among the output symbols of the FIR filter which are denoted as Y(n) to an pulse amplitude modulation (PAM) symbol which is closet to Y(n), where n=1, 2, . . . is the symbol index. The DSP defines the error signal e(n) by the following formula e(n)=Y(n)−Z(n), where Z(n) is denoted as the symbol after decision; and updates the coefficients of the FIR filter based on the calculated e(n) through the least-mean-square (LMS) algorithm. The e(n) signal output from the DSP is fed to a low-speed control circuitry to be converted into N equivalent currents to automatically control and adjust the N corresponding SOAs of the PIC.

With reference to one embodiment of the third aspect of the invention, the low-speed control circuitry is configured to include a low-speed digital-analog converter (DAC) to analogize the e(n) signal received from the DSP; an array of N automatic bias controls (ABC) is configured to convert the analogized signal received from the low-speed DAC into N output voltage values corresponding to the N SOAs of the PIC, where each of N ABCs is pre-set with a certain coefficient to adjust its output voltage to minimize the input error signal; and an array of N transconductance amplifiers (TA) is configured to convert the output voltages received from the N ABCs into N equivalent currents to control and adjust the N corresponding SOAs of the PIC.

With reference to yet another embodiment of the third aspect of the invention, the DSP further calculates, and updates digitally based on the e(n) to output N voltage values in digital form corresponding to the N SOAs of the PIC. Additionally, the low-speed control circuitry is configured to include an array of N low-speed DACs to convert the N voltage values in digital form received from the DSP into analog form; and an array of N transconductance amplifiers (TAs) is configured to convert the output voltages of N DACs into N equivalent currents to control and adjust the array of SOAs of the PIC.

Advantageous Effects

Embodiments of the present invention provide an IM-DD optical receiver which can be effectively, automatically and flexibly compensate and mitigate the optical chromatic dispersion. Compared with the prior art, the PIC of an receiver according to the present invention has advantages of small physical size which can be put into QSPF or SPF form factors. Further, as input signals are processed chromatic dispersion in optical domain and amplified by the SOAs of the PIC before detecting, it can achieve the outputs with high signal quality. Accordingly, the receiver of present invention is specifically compatible to high-speed IM-DD transmission systems with optimum performance and effective-cost thanks to its tunable and automatic scheme for chromatic dispersion compensation based on the feedback signal from the Rx DSP.

The effects of the present invention are not limited to the above-mentioned effects, and further effects not described above will be clearly understood by those skilled in the art from the appended claims.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION OF EMBODIMENTS OF THE INVENTION

Technical solutions in embodiments of the present disclosure are described below in connection with the accompanying drawings in the embodiments of the present disclosure. Obviously, the described embodiments are part of the embodiments of the present disclosure, but not all the embodiments. Based on the embodiments in the present disclosure, all other embodiments obtained by a person of ordinary skill in the art without creative work fall within the protection scope of the present disclosure.

It should be understood that in the following description, well known elements, functions, operations, techniques, etc. may not be described or illustrated in detail to avoid obscuring the subject matter of the disclosure.

Figure 1:
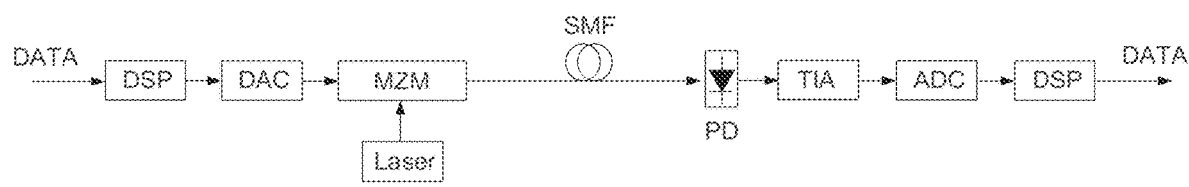
FIG. 1 shows a block diagram of a conventional IM-DD transmission system.

FIG. 1 shows a simplified block diagram of a conventional IM-DD transmission system.

Figure 2:
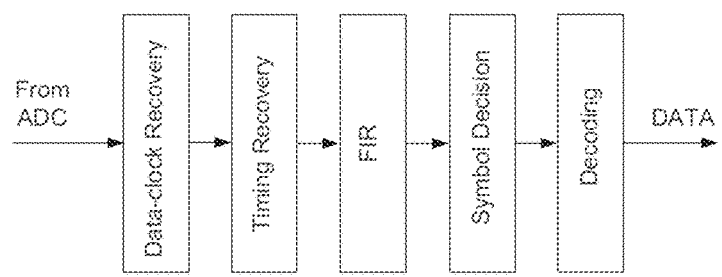
FIG. 2 shows a block diagram of a conventional Rx DSP for the reception of an IM-DD signal.

Referring to FIG. 1, at the transmitter, the data is encoded and mapped to a pulse-amplitude modulation (PAM) format, such as PAM 4 with 4 levels carrying 2 bits of information per symbol. After that the encoded digital waveform is generated, using a pulse-shaping technique. The encoding, symbol mapping and pulse-shaping are usually done using a digital signal processor (DSP). Next, the digital waveform is converted to an analog waveform using a digital-to-analog converter (DAC). The corresponding analog signal is used to modulate an optical modulation, such as an Mach-Zehnder modulator (MZM). At the receiver, the signal intensity is detected using a single ended photo-detector (PD) for simplicity. The PD converts the intensity of light into a corresponding current, which will be then amplified using a transimpedance amplifier (TIA). The received signal is then digitized by an analog-to-digital (ADC) and then processed by an DSP. The Rx DSP (at the receiver) usually performs data-clock recovery, timing recovery, feed-forward equalization using a finite impulse response (FIR) filter, symbol detection and decoding as shown in FIG. 2. Specifically, the DSP performs clock data recovery and timing recovery, the signal is then fed into a feed-forward equalizer using a FIR filter. The output symbols of the FIR filter is fed into a symbol decision, and the symbol after decision can be decoded by a decoder.

The impact of chromatic dispersion (CD) on an IM-DD system cannot be effectively mitigated using DSP technique as the information about the optical carrier phase is lost after direct detection. This situation requires the usage of optical CD compensation or mitigation prior direct detection. In the prior art, commons optical CD compensation techniques include dispersion compensating fiber (DCF) and fiber-Bragg grating (FBG). However, DCF and tunable FGB are too bulky and cannot be put into a hot-pluggable form factors which are required for Ethernet transceivers, such as QSFP and SFP. In addition, DCF provides a fixed compensation of the CD, which is not tunable.

In view of the foregoing problem, this invention disclosure provides a new design for a high-speed IM-DD receiver using a tunable photonic integrated circuit (PIC) for CD compensation prior direct detection by a PD.

Figure 3:
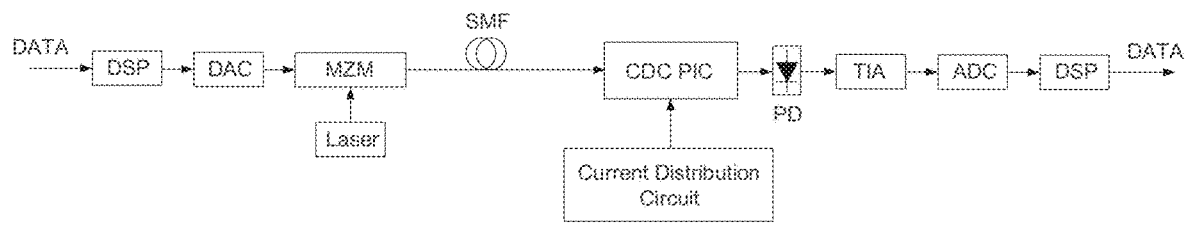
FIG. 3 shows a block diagram of an IM-DD transmission system using an optical receiver having a PIC with tunable CD compensation, which can be controlled manually using a current distribution circuit according to an embodiment of the present disclosure.

FIG. 3 illustrates a block diagram of an IM-DD transmission system using an optical receiver having PIC with tunable CD compensation, which can be controlled manually by using a current distribution circuit according to an embodiment of the present disclosure.

In FIG. 3, the currents to the PIC are supplied by a current distribution circuit, which can be controlled manually depending on the experience of the operator. The PIC uses an array of semiconductor optical amplifiers (SOA) and an array of optical delay lines and an array of phase shifters, which all can be integrated in an InP (Indium phosphide) or even SiP (Silicon photonics) substrates. As a result, the PIC can be fabricated in a form of small size, which can be put into QSFP or SFP form factors. The currents to the SOAs of the PIC are supplied by the current distribution circuit which can be manually controlled to provide a wide range of CD compensation.

Figure 4:
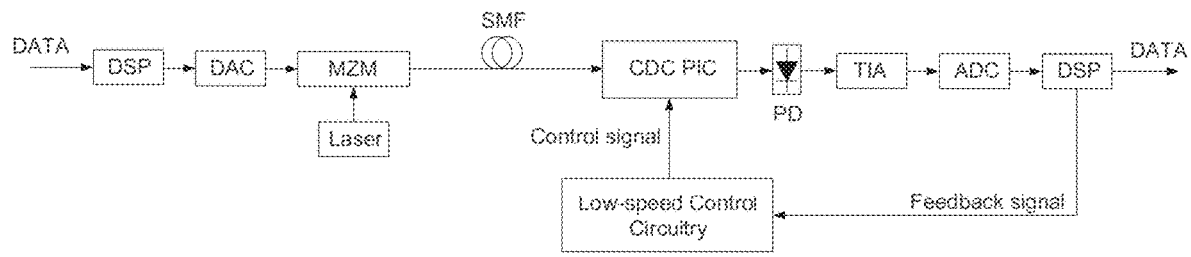
FIG. 4 shows a block diagram of an IM-DD transmission system using an optical receiver having a PIC with tunable CD compensation, which is controlled automatically using a feedback signal from the Rx DSP according to an embodiment of the present disclosure.

FIG. 4 illustrates a block diagram of an IM-DD transmission system using an optical receiver having a PIC with tunable CD compensation, which is controlled automatically using a feedback signal from the Rx DSP according to an embodiment of the present disclosure.

The architecture of a PIC and its working principle for chromatic dispersion compensation will be described in detail with respect to FIG. 5.

The dispersion of the fiber channel in the frequency domain can be expressed by using the following equation (1):

$$H(\omega) = \exp\left(-j\frac{\beta_2}{2}\omega^2 z\right), \quad (1)$$

where $\omega$ is the angular frequency; $\beta_2$ is the chromatic dispersion coefficient and z is the transmission distance.

To compensate the impact of dispersion, the PIC according to an embodiment of the invention aims at approximating the inverse response of the chromatic dispersion having the frequency response of the equation (2):

$$C(\omega) = H(\omega)^{-1} = \exp\left(j\frac{\beta_2}{2}\omega^2 z\right), \quad (2)$$

By limiting the frequency range of $C(\omega)$ to $[-\omega_0; \omega_0]$, where $$\frac{\omega_0}{2\pi}$$

is the Nyquist frequency of the baseband signal, the $C(\omega)$ can be expanded into a Fourier series as the equation (3):

$$C(\omega) = \sum_{k=0}^{\infty} c_k \exp\left(j\omega\frac{2\pi k}{2\omega_0}\right) = \sum_{k=0}^{\infty} c_k \exp(jk\omega\tau), \quad (3)$$

where $c_k$ is Fourier coefficient of $C(\omega)$; k is the index of $c_k$;

$$\tau = \frac{\pi}{\omega_0};$$

where $\omega_0 = 7B$;

$$\tau = \frac{1}{B} = 2T.$$

A PIC circuit according to an embodiment of the invention can be realized based on the Fourier series (3). The frequency transfer function of the PIC as shown in FIG. 5 is expressed by the equation (4):

$$F(\omega) = \sum_{k=0}^{(N-2)/2} (s_{2k+2}\exp(j(2k+2)\omega T) + s_{2k+1}\exp(j(2k+1)\omega T) + j\pi/2) \quad (4)$$

where N is optical path index; $S_{2k+2}$ and $S_{2k+1}$ are the gain coefficients of SOAs; (2 k+2)T and (2 k+1)T are delay coefficients for the array of optical delay paths; ($\pi/2$) is the phase-shifting degree for each optical path with odd index (1, 3, 5, . . . N−1) as shown in FIG. 5.

Accordingly, the frequency response $F(\omega)$ is represented by the equation (5):

$$F(\omega) = \sum_{k=0}^{(N-2)/2} (s_{2k+2}\exp(j\omega T) + js_{2k+1})\exp(j(2k+1)\omega T) \quad (5)$$

By adjusting the SOA gains properly, it can be achieved $s_{2k+2}\exp(j\omega T)+js_{2k+1}\cong c_k$. In this case, the equation (6) can be obtained:

$$F(\omega) \cong C(\omega), \quad (6)$$

which effectively means that the PIC with SOA array can compensate the chromatic dispersion of the fiber link.

Figure 5:
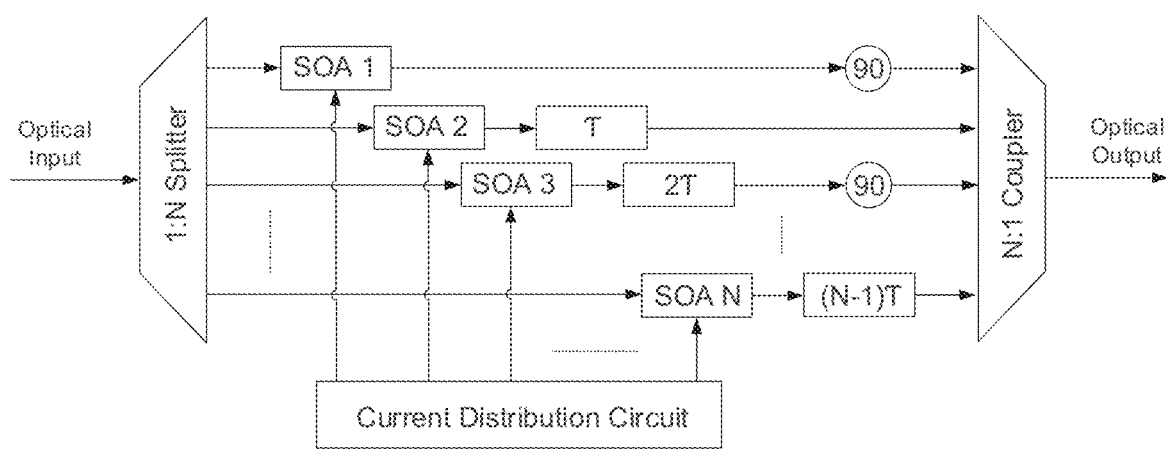
FIG. 5 illustrates overall architecture of a PIC for IM-DD signal using an array of SOAs according to an embodiment of the present disclosure.

As shown in FIG. 5, a PIC comprises an splitter 1:N to split the input optical signal into N copies, an array of N semiconductor optical amplifiers (SOAs) configured to amplify signals that are of N branches, an array of N optical delay lines configured to delay signals that are of N branches. The delay coefficients for the array of optical delay lines are {0, T, 2T, . . . (N−1) T}, respectively, where T=½B, and B is the system symbol rate. From these N optical paths, each optical path with odd index (1, 3, 5, . . . N−1) also includes a 90-degree phase-shifter. After that, all N optical paths are re-combined using an optical N:1 coupler. Accordingly, the PIC according to one embodiment of the invention acts as a pairs of FIR filter with N/2 complex taps for the input optical filter. The N/2 weights or coefficients of this FIR filter are complex and can be controlled by controlling the currents of the SOA arrays. By controlling the currents supplied to SOA, the optical gain can be controlled. As a result, with a proper adjustment of the SOA supplied currents, the chromatic dispersion can be effectively mitigated.

The array of SOAs, the array of optical delay lines and the array of phase shifters configured in a PIC all can be integrated in an InP (Indium phosphide) or even SiP (Silicon photonics) substrates. Accordingly, the PIC can be fabricated in a form of small size, which can be put into QSFP or SFP form factors.

The currents to the SOAs of a PIC are supplied by a low-speed control circuitry, which can be controlled and adjusted automatically based on the feedback signal from the Rx DSP as shown in FIG. 4. The adjustment process can be done when initializing the link. The advantage of such scheme is that it offers the optimum performance and significantly reduces effort for establishing the link.

Figure 6:
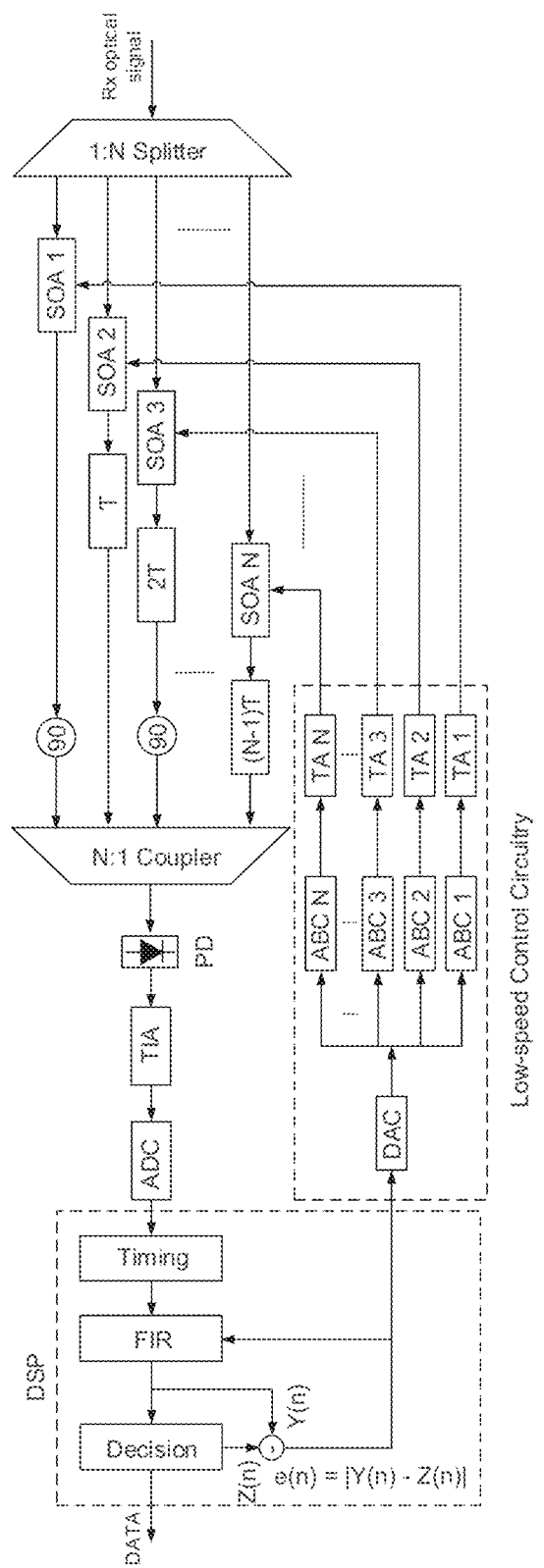
FIG. 6 illustrates a diagram showing automatic control of the PIC with a low-speed control circuitry having an array of ABCs based on the feedback signal from the Rx DSP according to an embodiment of the present disclosure.

FIG. 6 illustrates a diagram showing automatic control of the PIC with a low-speed control circuitry having an array of ABCs based on the feedback signal from the Rx DSP according to an embodiment of the present disclosure.

As shown in FIG. 6, the receiver of the present invention receives an input optical signal, e.g from a remote transmitter, via an external optical communication link (not shown in FIG. 6) by a photonic integrated circuit (PIC). The output optical signal, after processed by a PIC, is detected by a photo-detector (PD) and then digitized by an ADC before being fed into an DSP for signal processing. The DSP performs clock data recovery and timing recovery. After that, the signal is fed into a feed-forward equalizer using a FIR filter. The output symbols of the FIR filter are denoted as Y(n), where n=1, 2, . . . is the symbol index. For each symbol Y(n), decision is made by mapping this symbol to an ideal PAM symbol which is closet to Y(n). We denote the symbol after decision is Z(n). The error signal in this case is defined as:

$$e(n)=Y(n)-Z(n)$$

This error signal is used in two purposes:

i) e(n) is used for updating the coefficients of the FIR filter through the least-mean-square (LMS) algorithm ii) e(n) is fed to a low-speed DAC. The output of this low-speed DAC is analog signal, which is fed into an array of N automatic bias control (ABC). The N ABCs are respectively connected to N transconductance amplifiers (TA) and N SOAs. The outputs for these N ABCs are fed into N transconductance amplifiers (TA) to convert the output voltages of N ABCs to N equivalent currents, which are supplied to N SOAs. Each of N ABCs is pre-set with a certain coefficient to adjust its output voltage to minimize the input error signal. The certain coefficients stored in ABCs may be pre-set by an operator. As a result, the array of ABCs here acts as an automatic controller for all SOAs based on a single input feedback signal from the Rx DSP. The low-speed DAC, array of ABCs and TAs can be integrated together in a low-speed control circuitry for the array of SOAs.

Figure 7:
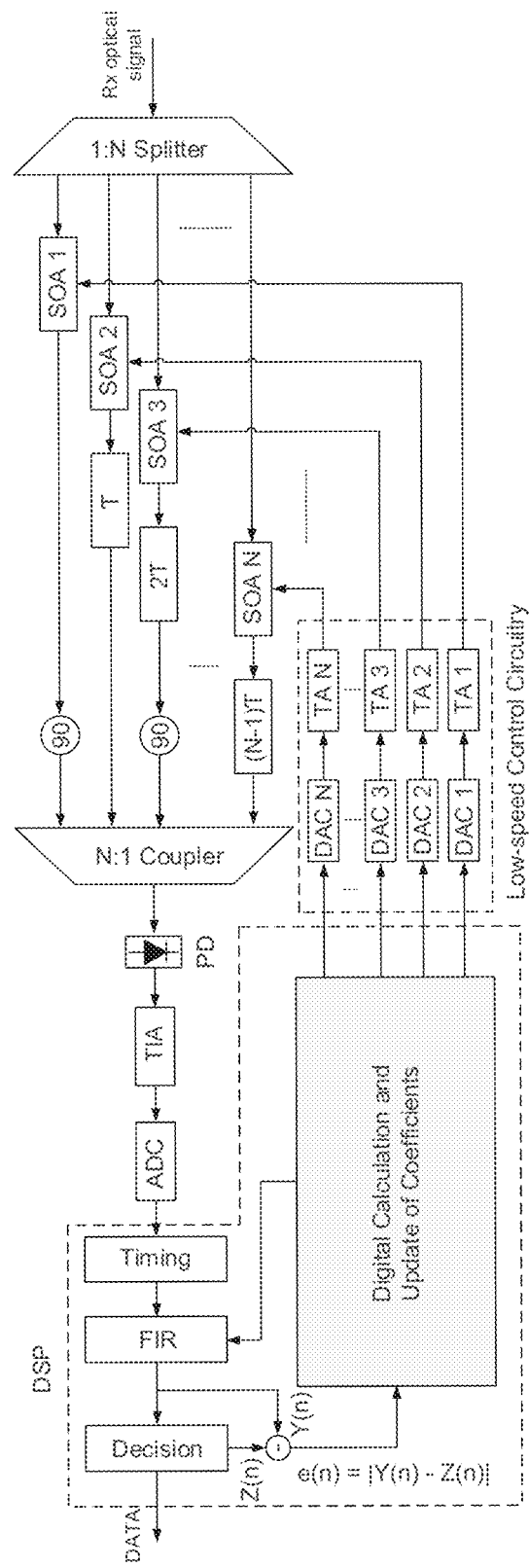
FIG. 7 illustrates a diagram showing automatic control of the PIC with a low-speed control circuitry having an array of low-speed DACs and TAs based on the feedback signal from the Rx DSP according to another embodiment of the present disclosure.

In another embodiment of the present disclosure, the automatic control of a PIC in high-speed IM-DD transmission system is shown in FIG. 7.

FIG. 7 illustrates an automatic control of the PIC with a low-speed control circuitry having an array of low-speed DACs and TAs based on the feedback signal from the Rx DSP according to another embodiment of the present disclosure.

As shown in FIG. 7, the output optical signal, after processed by a PIC, is detected by a PD, and then digitized by an ADC before being fed into an DSP for signal processing. The DSP performs clock data recovery and timing recovery. After that, the signal is fed into a feed-forward equalizer using a FIR filter. The output symbols of the FIR filter are denoted as Y(n), where n=1, 2, . . . is the symbol index. For each symbol Y(n), decision is made by mapping this symbol to an ideal PAM symbol which is closet to Y(n). We denote the symbol after decision is Z(n). The error signal in this case is defined as:

$$e(n)=Y(n)-Z(n)$$

In this scheme the error signal e(n) is also used for two purposes;

i) e(n) is used for updating the coefficients of the FIR filter through the least-mean-square (LMS) algorithm ii) e(n) is used to calculate and update digitally the currents supplied to the array of SOAs. This calculation is done within the Rx DSP. Due to the low-speed nature of this updating procedure, it does not increase the overall complexity of the Rx DSP. The output of this calculation is N voltage values in digital form. These N values are then converted into the analog domain using and array of N low-speed DACs. The outputs of these N low-speed DACs are fed into the input of N TAs operated in the fixed gain mode. The outputs of these TAs are then used to control the arrays of SOAs.

Although the present disclosure has been described with various embodiments, various changes and modifications may be suggested to one skilled in the art. It is intended that the present disclosure encompass such changes and modifications as fall within the scope of the appended claims.

The invention claimed is:

1. A photonic integrated circuit (PIC) for flexible chromatic dispersion compensation (CDC) in an optical communications system, comprising:
    an 1:N optical splitter to split an input optical signal into N copies, where N is an even number;
    an array of N semiconductor optical amplifiers (SOA) to receive the N optical outputs from the optical splitter;
    an array of optical delay lines to receive the outputs from the N SOAs, wherein:
        the delay coefficients for the array of optical delay lines are {0, T, 2T, . . . (N−1) T}, where T=½B, where B is the system symbol rate, and
        each optical path with odd index (1, 3, 5, . . . N−1) from the N optical paths includes a 90-degree phase-shifter; and
    an optical N:1 coupler to re-combine all N optical paths.

2. The photonic integrated circuit according to claim 1, wherein the SOAs can be controlled and adjusted automatically by a low-speed control circuitry using a feedback signal from a digital signal processor for providing chromatic dispersion (CD) compensation.

3. The photonic integrated circuit according to claim 1, wherein the SOAs can be controlled and adjusted manually by the currents supplied by a current distribution circuit for providing chromatic dispersion (CD) compensation.

4. A method for automatically controlling a photonic integrated circuit (PIC) for flexible chromatic dispersion compensation (CDC) according to claim 1 in a receiver of optical communications system, the method comprising:
receiving an input optical signal by a photonic integrated circuit (PIC), wherein the PIC is configured to:
split the input optical signal into N copies by an 1:N optical splitter, where N is an even number,
feed the N optical signals output from the optical splitter to an array of N semiconductor optical amplifiers (SOA),
feed the outputs from the N SOAs to an array of optical delay lines, wherein:
the delay coefficients for the array of optical delay lines are $\{0, T, 2T, \ldots (N-1) T\}$, where $T=\frac{1}{2}B$, where B is the system symbol rate,
each optical path with odd index $(1, 3, 5, \ldots N-1)$ from the N optical paths includes a 90-degree phase-shifter, and
re-combine all N optical paths using an optical N:1 coupler;
detecting, by a photo-detector (PD), optical signal output from a PIC into electrical signal;
amplifying the received electrical signal by a transimpedance amplifier (TIA);
digitalizing the amplified signal by using an analog-to-digital converter (ADC);
processing the digitalized signal by a digital signal processor (DSP), wherein the DSP performs clock data recovery and timing recovery, feeds the signal after timing recovery into a feed-forward equalizer using a Finite impulse response (FIR) filter, and makes decision by mapping each symbol among the output symbols of the FIR filter which are denoted as Y(n) to an pulse amplitude modulation (PAM) symbol which is closet to Y(n), where n=1, 2, . . . is the symbol index;
defining the error signal e(n) by the DSP by the following formula:

$$e(n)=Y(n)-Z(n)$$

where Z(n) is denoted as the symbol after decision;
feeding the e(n) feedback from the DSP to a low-speed digital-analog converter (DAC) to analogize the e(n) signal;
feeding the output of the low-speed DAC into an array of N automatic bias control (ABC) corresponding to the N SOAs of the PIC, where each of N ABCs is pre-set with a certain coefficient to adjust its output voltage to minimize the input error signal;
feeding the outputs of the N ABCs into N transconductance amplifiers (TA) corresponding to the N SOAs of the PIC to convert the output voltages of N ABCs to N equivalent currents;
supplying the N equivalent currents output from N TAs to N corresponding SOAs to control and adjust the array of SOAs of the PIC.

5. The method according to claim 4, wherein the DSP is further configured to update the coefficients of the FIR filter based on the e(n) through the least-mean-square (LMS) algorithm.

6. A method for automatically controlling a photonic integrated circuit (PIC) for flexible chromatic dispersion compensation (CDC) according to claim 1 in a receiver of optical communications system, the method comprising:
receiving an input optical signal by a photonic integrated circuit (PIC), wherein the PIC is configured to:
split the input optical signal into N copies by an 1:N optical splitter, where N is an even number,
feed the N optical signals output from the optical splitter to an array of N semiconductor optical amplifiers (SOA),
feed the outputs from the N SOAs to an array of optical delay lines, wherein:
the delay coefficients for the array of optical delay lines are $\{0, T, 2T, \ldots (N-1) T\}$, where $T=\frac{1}{2}B$, where B is the system symbol rate,
each optical path with odd index $(1, 3, 5, \ldots N-1)$ from the N optical paths includes a 90-degree phase-shifter, and
re-combine all N optical paths using an optical N:1 coupler;
detecting, by a photo-detector (PD), optical signal output from a PIC into electrical signal;
amplifying the received electrical signal by a transimpedance amplifier (TIA);
digitalizing the amplified signal by using an analog-to-digital converter (ADC);
processing the digitalized signal by a digital signal processor (DSP), wherein the DSP performs clock data recovery and timing recovery, feeds the signal after timing recovery into a feed-forward equalizer using a Finite impulse response (FIR) filter, and makes decision by mapping each symbol among the output symbols of the FIR filter which are denoted as Y(n) to an pulse amplitude modulation (PAM) symbol which is closet to Y(n), where n=1, 2, . . . is the symbol index;
defining the error signal e(n) by the DSP by the following formula:

$$e(n)=Y(n)-Z(n)$$

where Z(n) is denoted as the symbol after decision;
calculating and updating digitally, by the DSP, based on the e(n) to output N voltage values in digital form corresponding to the N SOAs of the PIC;
converting the N voltage values output from the DSP into analog form using an array of N low-speed DACs;
feeding the outputs of the N low-speed DACs to N transconductance amplifiers (TA) corresponding to the N SOAs of the PIC to convert the output voltages of N DACs into N equivalent currents; and
supplying the N equivalent currents output from N TAs to N corresponding SOAs to control and adjust the array of SOAs of the PIC.

7. The method according to claim 6, wherein the DSP is further configured to update digitally the coefficients of the FIR filter based on the e(n) through the least-mean-square (LMS) algorithm.

8. An optical receiver of an optical communications system, comprising:
a PIC including N SOAs according to claim 1;
a photo-detector (PD) for detecting optical signal output from a PIC into electrical signal;
a transimpedance amplifier (TIA) for amplifying the electrical signal output from the PD;
an analog-to-digital converter (ADC) for digitalizing the amplified signal output from TIA;

a digital signal processor (DSP) for processing the digitalized signal output from the ADC, wherein:

the DSP performs clock data recovery and timing recovery, feeds the signal after timing recovery into a feed-forward equalizer using a Finite impulse response (FIR) filter, and makes decision by mapping each symbol among the output symbols of the FIR filter which are denoted as Y(n) to an pulse amplitude modulation (PAM) symbol which is closet to Y(n), where n=1, 2, . . . is the symbol index, and the DSP is configured to defines the error signal e(n) by the following formula:

$$e(n)=Y(n)-Z(n)$$

where Z(n) is denoted as the symbol after decision; and a low-speed control circuitry is configured to receive the e(n) signal output from the DSP and convert the received e(n) signal into N equivalent currents to automatically control and adjust the N corresponding SOAs of the PIC.

9. The optical receiver according to claim 8, wherein the DSP is further configured to update the coefficients of the FIR filter based on the calculated e(n) through the least-mean-square (LMS) algorithm.

10. The optical receiver according to claim 8, wherein the low-speed control circuitry comprises:

a low-speed digital-analog converter (DAC) configured to analogize the e(n) signal received from the DSP;

an array of N automatic bias controls (ABC) configured to convert the analogized signal received from the low-speed DAC into N output voltage values corresponding to the N SOAs of the PIC, where each of N ABCs is pre-set with a certain coefficient to adjust its output voltage to minimize the input error signal; and an array of N transconductance amplifiers (TA) configured to convert the output voltages received from the N ABCs into N equivalent currents to control and adjust the N corresponding SOAs of the PIC.

11. The optical receiver according to claim 8, wherein the DSP is further configured to calculate and update digitally based on the e(n) to output N voltage values in digital form corresponding to the N SOAs of the PIC.

12. The optical receiver according to claim 11, wherein the low-speed control circuitry comprises:

an array of N low-speed digital-analog converters (DACs) configured to convert the N voltage values in digital form received from the DSP into analog form;

an array of N transconductance amplifiers (TAs) configured to convert the output voltages of N DACs into N equivalent currents to control and adjust the array of SOAs of the PIC.

* * * * *